Feb. 2, 1926.
A. A. GRISWOLD ET AL
1,571,582
FLEXIBLE SHINGLE WIRING MACHINE
Filed May 12, 1922
9 Sheets-Sheet 1
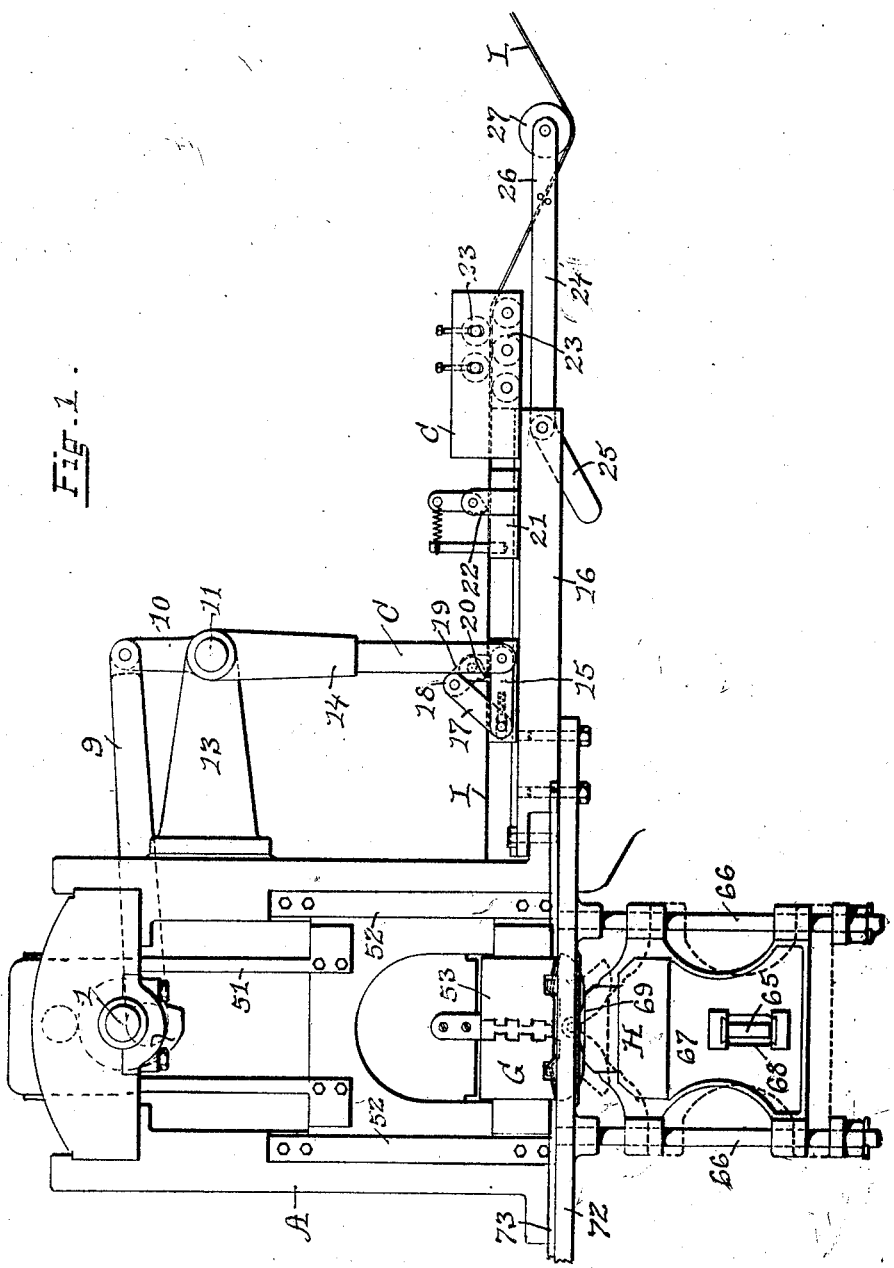

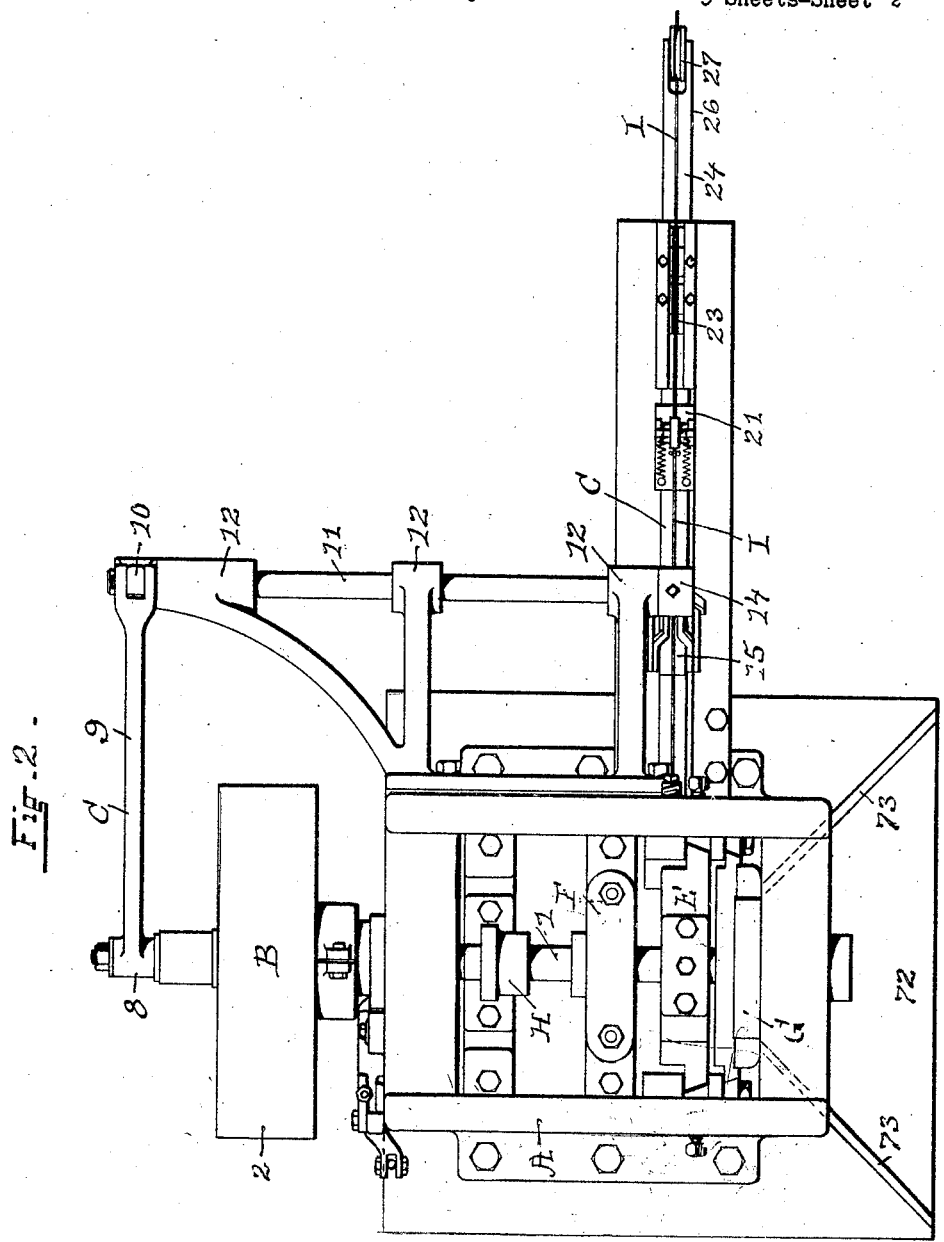

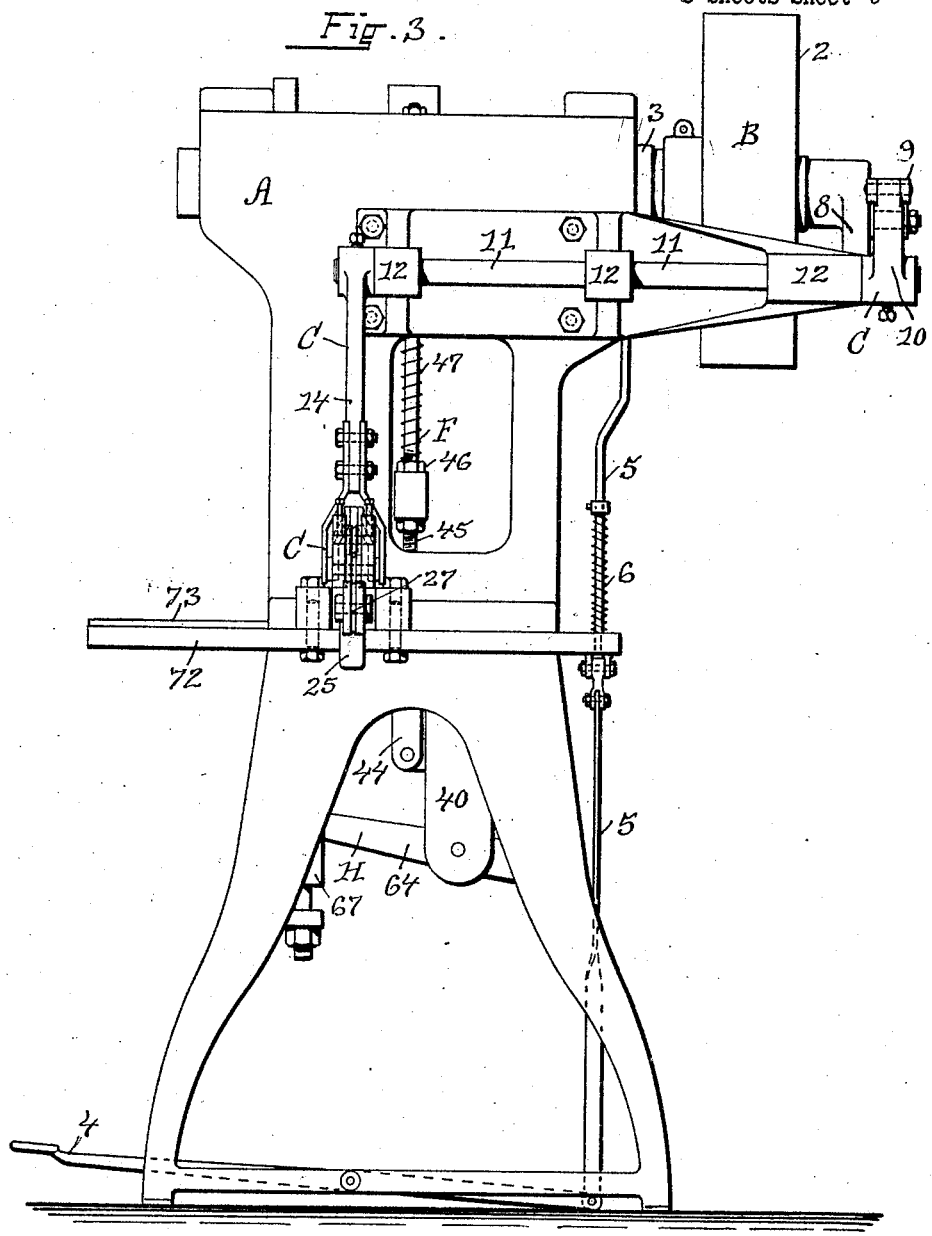

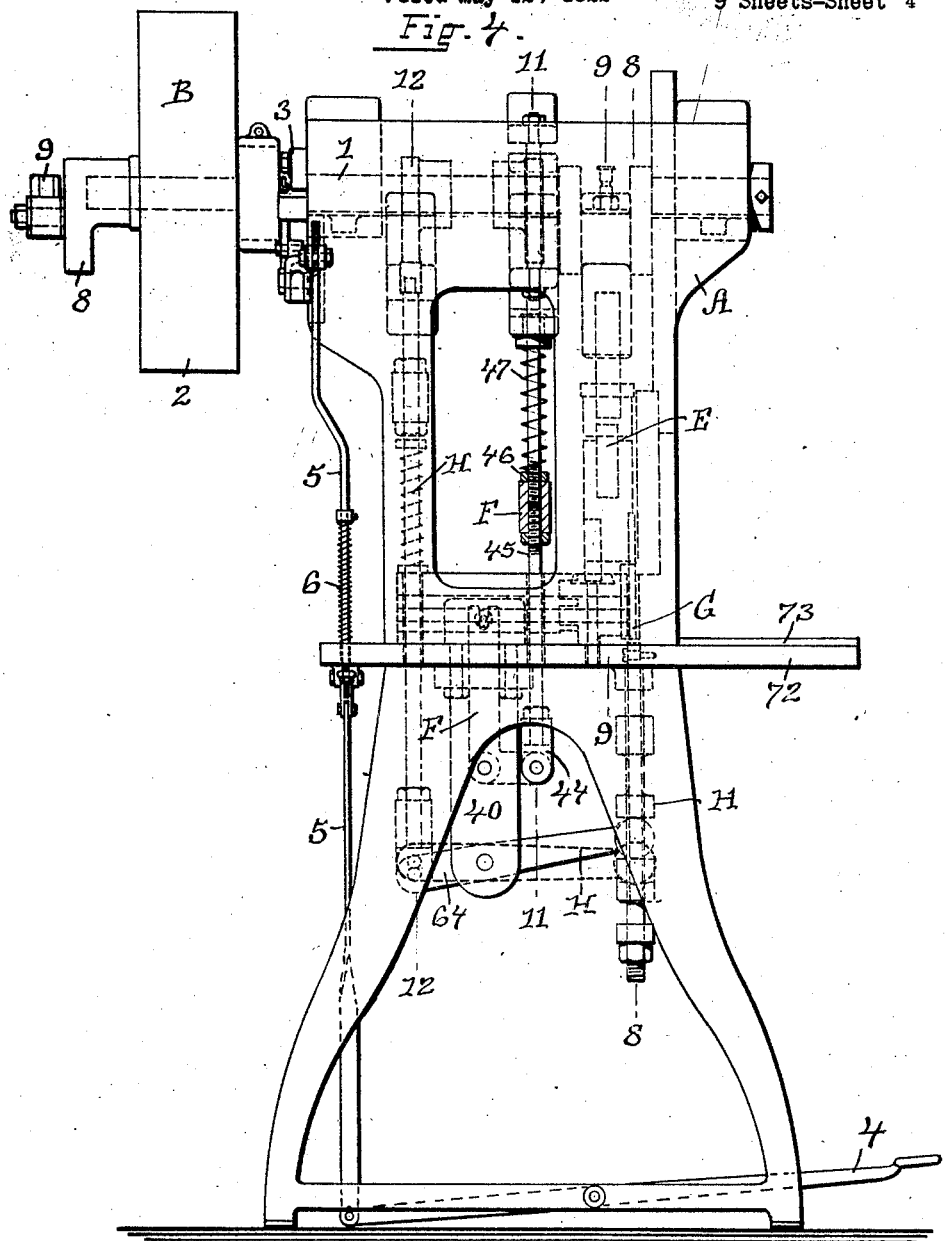

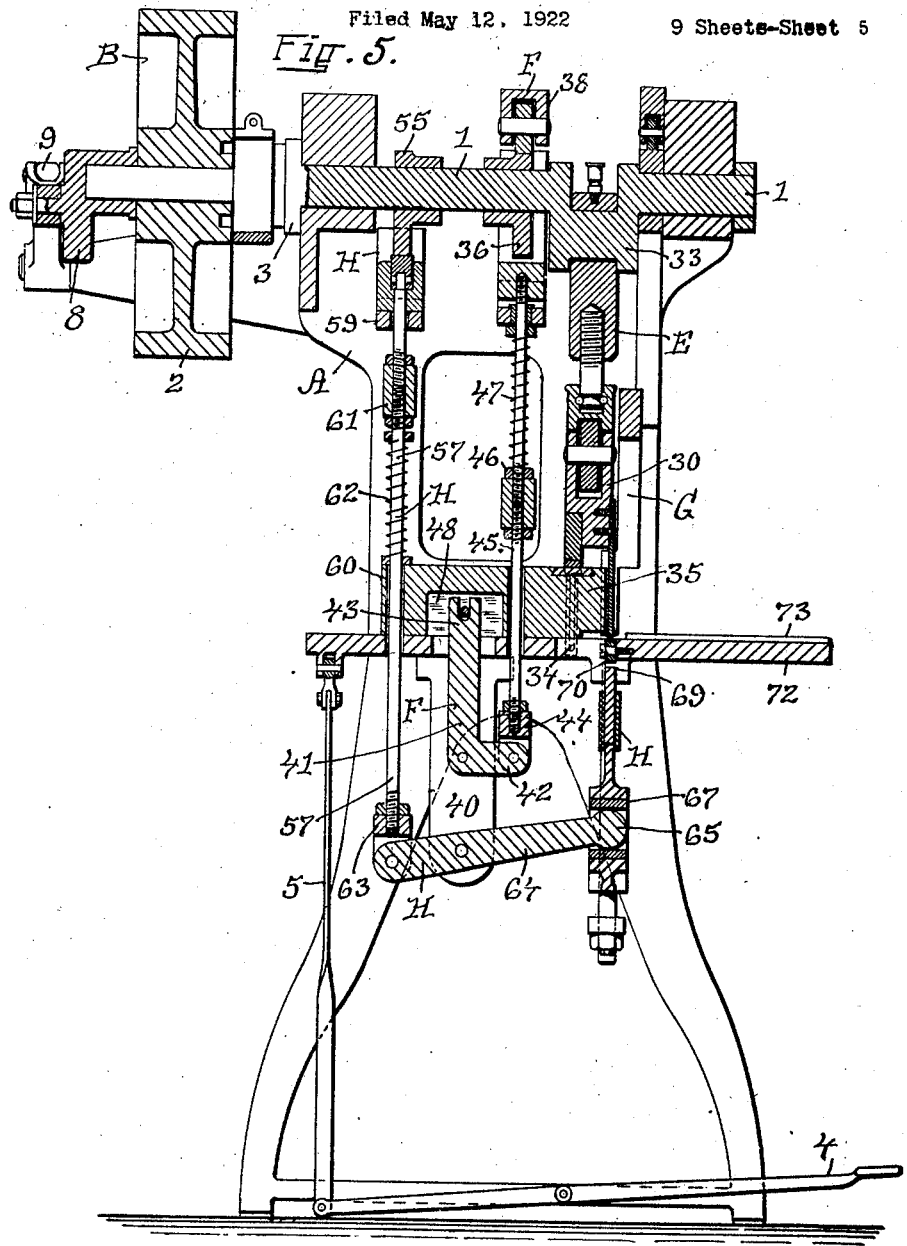

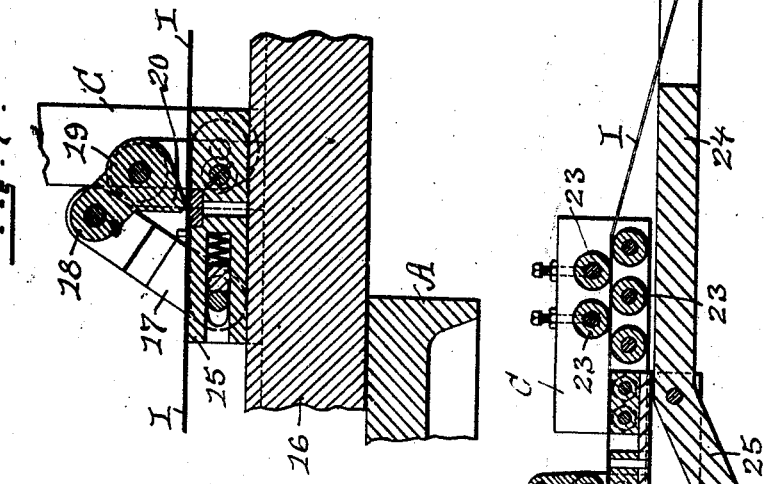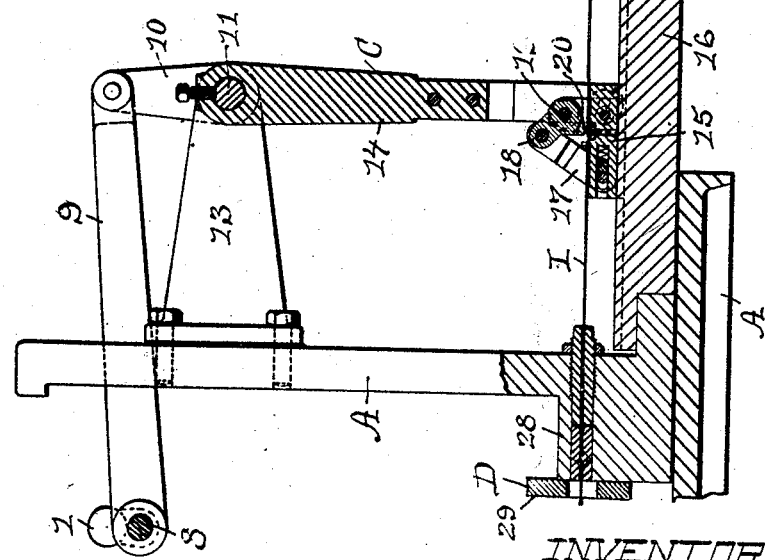

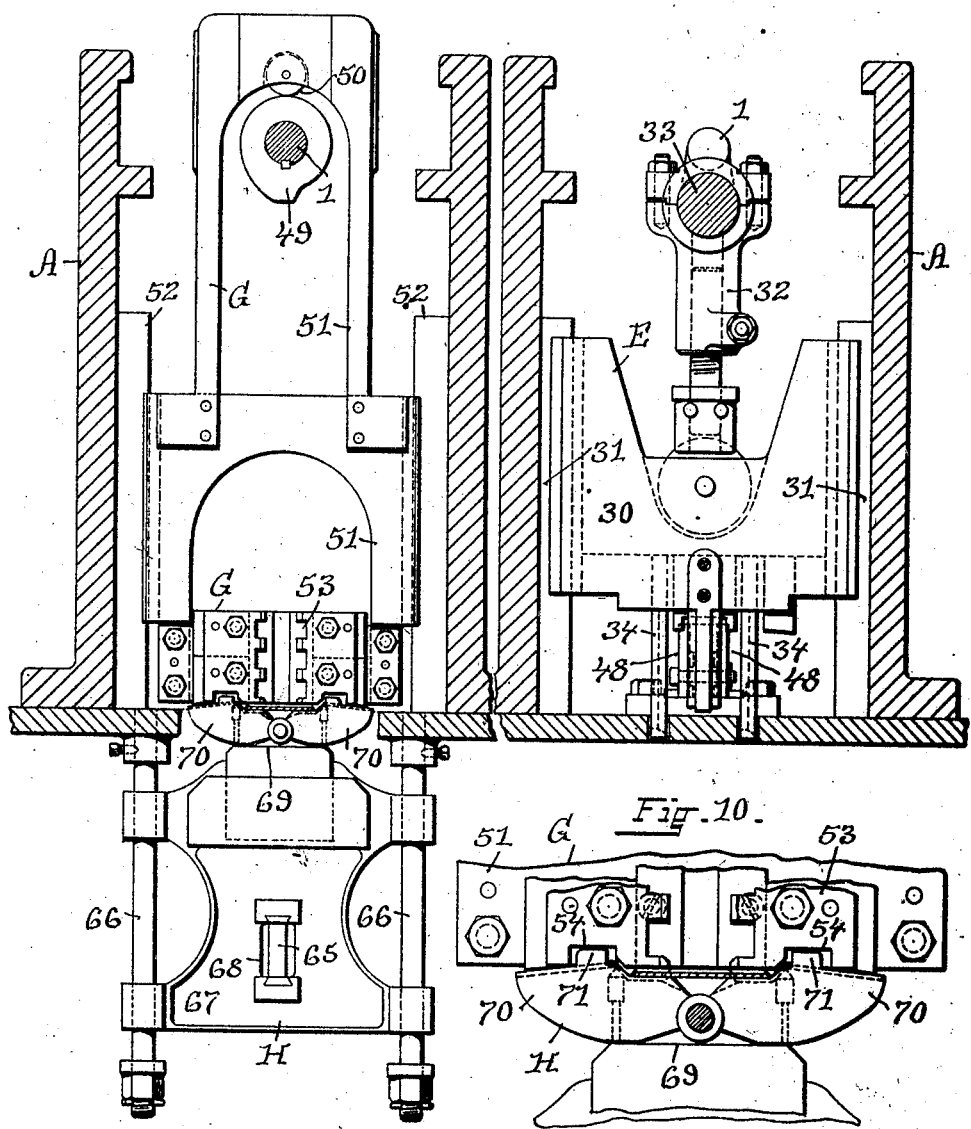

Feb. 2, 1926.  
A. A. GRISWOLD ET AL  
1,571,582  
FLEXIBLE SHINGLE WIRING MACHINE  
Filed May 12, 1922   9 Sheets-Sheet 8

INVENTORS.  
Albert Abbe Griswold  
and Alvin Carroll Goddard  
by Chas. H. Luther  
ATTORNEY.

Feb. 2, 1926.  1,571,582
A. A. GRISWOLD ET AL
FLEXIBLE SHINGLE WIRING MACHINE
Filed May 12, 1922   9 Sheets-Sheet 9
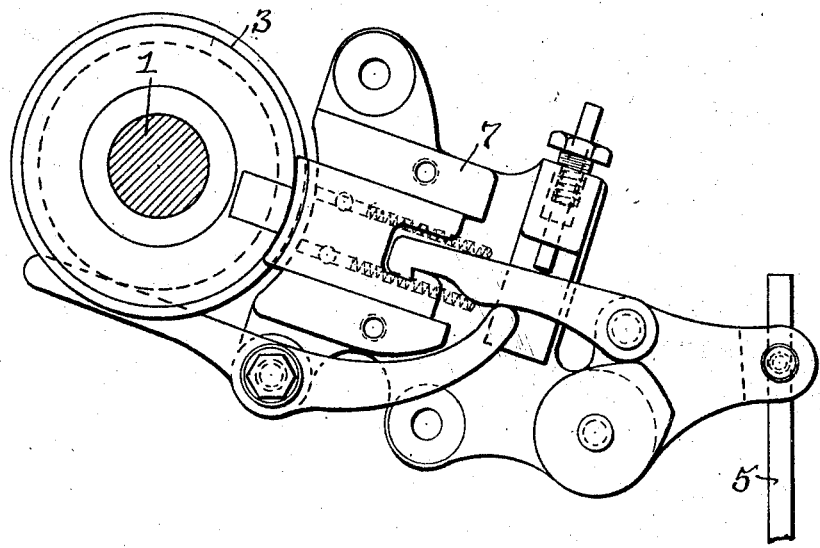
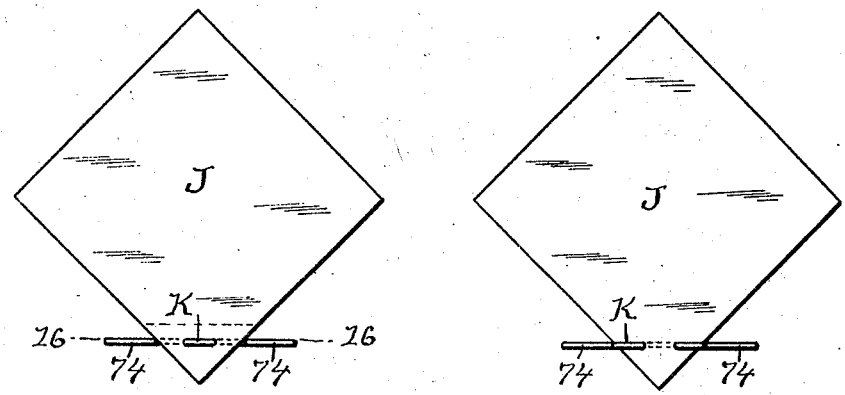
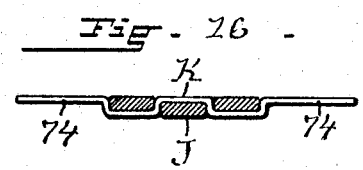
INVENTORS:
Albert Abbe Griswold
and Alvin Carroll Goddard
by Chas. H. Luther
ATTORNEY:

Patented Feb. 2, 1926.

1,571,582

UNITED STATES PATENT OFFICE.

ALBERT ABBE GRISWOLD, OF PROVIDENCE, RHODE ISLAND, AND ALVIN CARROLL GODDARD, OF RICHMOND HILL, NEW YORK, ASSIGNORS, BY DIRECT AND MESNE ASSIGNMENTS, OF ONE-HALF TO SAID GRISWOLD AND ONE-HALF TO JOHN FRANCIS CHEVALIER, OF BROOKLINE, MASSACHUSETTS.

FLEXIBLE-SHINGLE-WIRING MACHINE.

Application filed May 12, 1922. Serial No. 560,481.

*To all whom it may concern:*

Be it known that we, ALBERT ABBE GRISWOLD, a citizen of the United States, and ALVIN CARROLL GODDARD, a citizen of the United States, and residents, respectively, of Providence, in the county of Providence and State of Rhode Island, and Richmond Hill, Queens County, Long Island, State of New York, have jointly invented a new and useful Improvement in Flexible-Shingle-Wiring Machines, of which the following is a specification.

Our invention has reference to an improvement in manufacturing flexible shingles and more particularly to an improvement in a machine for inserting a fastening wire into a flexible shingle thereby forming on a flexible shingle means for holding down the otherwise free end of the shingle, such means being the same as shown in United States Patent No. 1,274,410, granted August 6, 1918 to Albert Abbe Griswold, one of the present joint inventors.

The object of our invention is to improve the construction of a flexible shingle wiring machine, whereby on depression of a foot treadle the machine will feed a predetermined length of wire into the machine and simultaneously straighten the wire, form the wire into an inverted U shaped staple, move the staple into a forward position, drive the staple down through the corner of a flexible shingle and form the staple into the required form of a transverse fastening member on the shingle, as shown in the United States patent referred to.

Our invention consists in the peculiar and novel construction and operation of a flexible shingle wiring machine, said flexible shingle wiring machine having details of construction, as will be more fully set forth hereinafter and claimed.

Figure 1 is a front view of the greater portion of our improved flexible shingle wiring machine.

Figure 2 is a top plan view of the machine.

Figure 3 is a side view looking at the right hand side of the machine.

Figure 4 is a side view looking at the left hand side of the machine.

Figure 5 is a central vertical sectional view through the machine.

Figure 6 is an enlarged detail vertical sectional view through the wire feed mechanism.

Figure 7 is a still further enlarged detail sectional view of that part of the wire feed mechanism that grips and feeds the wire into the machine.

Figure 8 is an enlarged detail vertical sectional view, taken approximately on line 8, 8 of Figure 4.

Figure 9 is a sectional view similar to Figure 8, taken approximately on line 9, 9 of Figure 4.

Figure 10 is a still further enlarged detail face view of that part of the mechanism which shapes the wire into a fastening member, on the shingle.

Figure 13 is an enlarged face view of the clutch operating mechanism.

Figure 14 is a plan view of a flexible shingle showing the fastening wire or member in place.

Figure 15 is an inverted plan view of Figure 14 and

Figure 16 is an enlarged detail transverse sectional view through the shingle, taken on line 16, 16 of Figure 14.

Figures 11, 12:
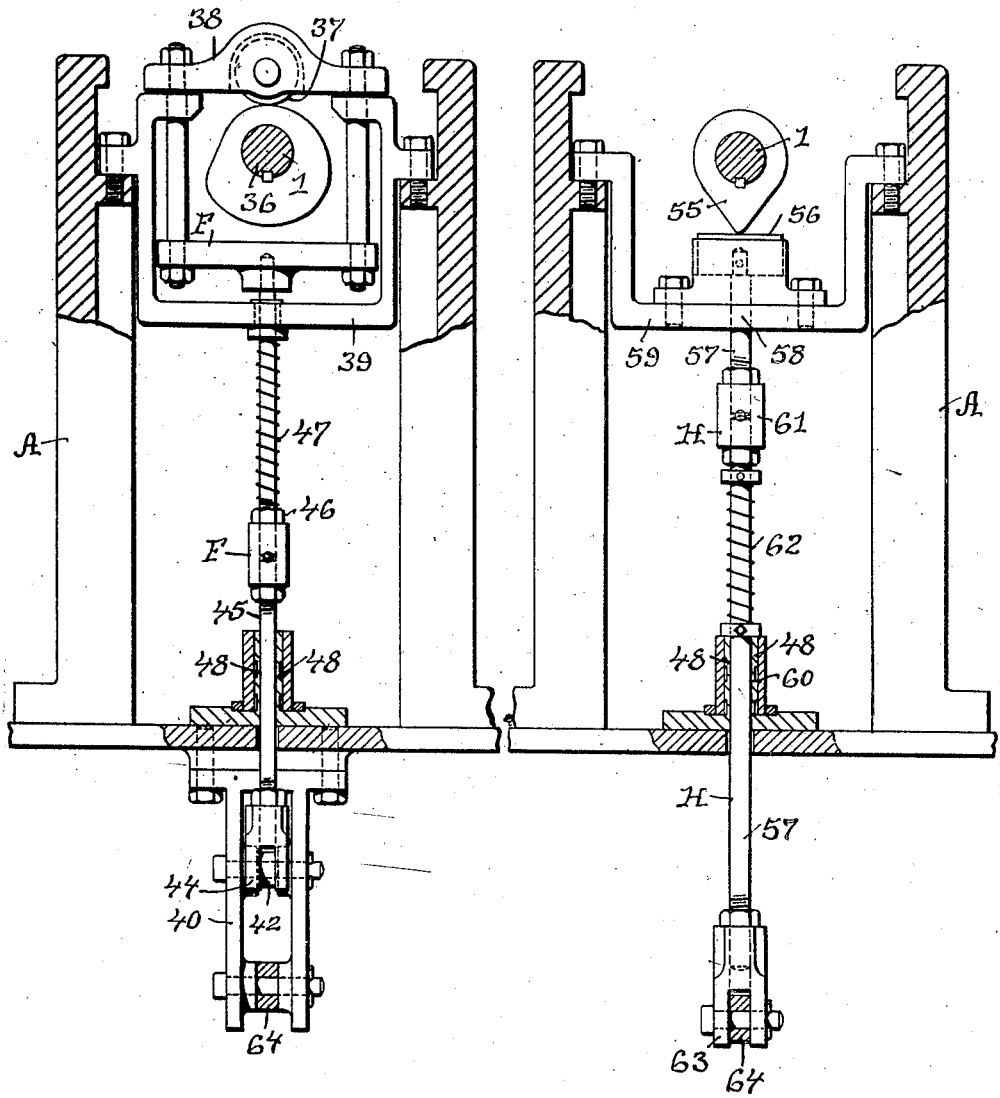
Figure 11 is a sectional view similar to Figure 8, taken on line 11, 11 of Figure 4.
Figure 12 is a sectional view similar to Figure 8, taken on line 12, 12 of Figure 4.

Our improved flexible shingle wiring machine consists essentially of the following elements, a frame, a foot controlled driving mechanism, a wire feed mechanism, a wire cutter, a staple forming mechanism, a staple forward carrying mechanism, mechanism for forcing the staple through a shingle and mechanism for forming the staple into a wire fastening member on the shingle.

In the drawings A indicates the frame, B the driving mechanism, C the wire feed mechanism, D the wire cutter, E the staple forming mechanism, F the staple forward carrying mechanism, G the staple downward moving mechanism, to force the staple through a shingle, H the butterfly mechanism for forming with the staple downward moving mechanism G, the staple into a wire fastening member K on the shingle, I the wire and J a flexible shingle having the wire fastening member K.

The frame A may be constructed as shown or in any form adapted to support the operative mechanisms.

The driving mechanism B, consists of a driving shaft 1 supported in suitable bearings in the frame A. On the driving shaft 1 is a loose pulley 2 having one half of a clutch 3. The other half of the clutch 3 is splined to the driving shaft 1. A foot treadle 4 is pivotally secured to the frame A and through connecting rods 5, 5, and spring 6 is operatively connected to a clutch operating mechanism 7, as shown in Figures 3, 4, 5 and 13, which in turn operates the half of the clutch 3 which is splined to the driving shaft 1. The clutch operating mechanism 7 shown in Figure 13 is a Standard V. & O. Press Co., one stroke clutch mechanism and no claim is made to this clutch operating mechanism 7. A depression of the foot treadle 4, will through the connecting rods 5, 5, spring 6 and clutch operating mechanism 7, allow the driving mechanism B to operate so that the machine will make one complete operation and stop, for each operation of the foot treadle.

The wire feed mechanism C consists of a crank 8 on the driving shaft 1 operatively connected with a horizontal bar 9 which in turn is operatively connected to a vertical lever 10 on the rear end of a shaft 11 in bearings 12, 12, in a bracket 13, on the frame A. On the forward end of the shaft 11 is a vertical lever 14 operatively connected at its lower end to a slide 15 sliding in ways on a horizontal extension 16 of the frame A. The slide 15 has a spring operated arm 17 pivotally connected to a lever 18 on a wire gripping member 19, which has a wire gripping jaw 20 and which is pivotally secured to vertical arms on the slide 15, as shown in Figure 7. The wire is gripped between the wire gripping jaw 20 and the top of the slide 15, to feed the wire I into the machine. On the frame extension 16 to the right of the slide 15 is a block 21 and a spring operated wire gripping jaw 22 which allows a free inward movement of the wire I and also prevents a retrograde movement of the wire I. To the right of the block 21 and rotatably supported in bearings on the frame extension 16 is a series of wire straightening rolls 23, 23. On the end of the extension 16 is pivotally secured a normally horizontal arm 24 having a bent inner stop end 25 and a bifurcated outer end 26 in which is pivotally secured a grooved pulley 27. The wire I comes from a source of supply, not shown, under the pulley 27, through the straightening rolls 23, 23, under the wire gripping jaws 22 and 20 and then through a hardened steel bushing 28 in the frame A. The bushing 28 has a flat end and forms one part of the wire cutter D. Slidably supported against the flat end of the bushing 28 is the other part 29 of the wire cutter D. This part 29 consists of a flat piece of tool steel with a hole through it for the wire I, as shown in Figure 6 and is connected to and is operated by the staple forming mechanism E.

The staple forming mechanism E consists of a slide 30 slidably supported on vertical ways 31, 31 on the frame A. An adjustable connecting rod 32 pivotally and adjustably connects the slide 30 with a crank 33 on the driving shaft 1. The slide 30 carries two spaced downwardly extending bars 34, 34, as shown in Figure 9, which straddle a staple forming block 35 and which, after a predetermined length of the wire I has been cut off and fed into the machine, forms this cut-off piece of wire into an inverted U-shaped staple over the staple forming block 35, as shown in Figure 5.

The staple forward carrying mechanism F consists of a cam 36 on the driving shaft 1 and engaging with a roll 37 in a frame 38 vertically and reciprocally supported in bearings in a fixed frame 39 secured to the main frame A. Pivotally secured to a bracket 40 on the bed of the frame A is a bell-crank lever 41 having a horizontal arm 42 and a vertical arm 43. On the end of the horizontal arm 42 is a link 44 to which is adjustably secured the lower end of a vertical connecting rod 45, the upper end of which is adjustably secured to the reciprocating frame 38. This connecting rod 45 extends through a bearing in the fixed frame 39 and has a nut 46 and a coiled spring 47 intermediate the nut 46 and the fixed frame 39. The upper end of the vertical arm 43 of the bell-crank lever 41 extends upward through an opening in the bed of the machine and into a transverse opening in the staple forming block 35, as shown in Figure 5. At each side of the staple forming block 35 is a staple forward pushing plate 48 operatively connected to the upper end of the vertical arm 43 of the bell-crank lever 41. The spring 47 operates to move the staple forward pushing plates 48, 48 towards the front of the machine and push the formed staple off the end of the staple forming block 35 and into a position for the staple downward moving mechanism G, to force the staple through the shingle. The cam 36 operates to move the staple forward pushing plates 48, 48 back into their normal position.

The staple downward moving mechanism G consists of a cam 49 on the driving shaft 1 and engaging with a roll 50 on a vertical slide frame 51 slidably supported on ways 52, 52 on the frame A, as shown in Figure 8. The lower end 53 of the slide frame 51 is shaped to form one half of a die with recesses 54, 54 and otherwise shaped to form, with the butterfly half of the die, to be hereinafter described, the U-shaped staple into the completed fastening member K on the shingle, as shown in Figures 14, 15 and 16. The cam 49 lifts the slide frame 51 and on the downward movement of the slide frame 51, its weight is sufficient to do the work required in forming a staple into a wire fastening member on the shingle.

The butterfly mechanism H, consists of a cam 55 on the driving shaft 1 engaging with a block 56 on the upper end of a vertical connecting rod 57, working through a bearing 58 in a U-shaped frame 59 secured to the main frame A. This connecting rod 57 passes downward through a bearing 60 on the machine and a hole in the bed of the machine, as shown in Figure 12. On the connecting rod 57 is an adjusting member 61 and a coiled spring 62, intermediate the bearing 60 and the adjusting member 61. The lower end 63 is pivotally secured to a practically horizontal lever 64 which has a forward end 65 and is pivotally connected to the bracket 40 on the frame A, as shown in Figure 5. Supported from the bed of the frame A, in a forward position are guide ways 66, 66 which slidably support a slide frame 67 having a slot 68 for the forward end 65 of the lever 64. The upper end of the slide frame 67 has a flat horizontal surface 69. Pivotally secured to the bed of the frame A, in an opening in the bed, are the butterfly wing members 70, 70, as shown in Figures 5, 8 and 10, in the closed position. These butterfly wing members 70, 70, rest on the flat horizontal surface 69 of the slide frame 67. They have projections 71, 71 which enter the recesses 54, 54, in the lower end of the slide frame 51 and are otherwise shaped, as shown in Figure 10, to form, with the other half of the die on the slide frame 51, the wire staple into the completed fastening member K, on the shingle, as shown in Figures 14, 15 and 16. The cam 55 forces the connecting rod 57 downwards against the tension of the spring 62. This moves the forward end 65 of the lever 64 upwards and with it the slide frame 67. The flat horizontal surface 69 of the slide frame 67 engaging with the lower edges of the butterfly wing members 70, 70, force these wing members 70, 70, upwards into the closed position, as shown in Figure 10, thereby forming the fastening member K on the shingle. On the upward movement of the cam 55, the spring 62, assisted by the weight of the slide frame 67, allows the butterfly wing members 70, 70 to drop down, so as to release the shingle.

On a flat front extension 72, of the bed of the frame A are angular guide ribs 73, 73 at right angles to each other, as shown in Figure 2.

The wire I may be of any required size or shape. It is preferably flat in cross section.

The flexible shingle J is constructed preferably of felt and asphalt with an outer surface of ground slate.

The fastening member K has ends 74, 74 and is given the form, in the shingle J, as shown in Figure 16, by the staple downward moving mechanism G and the butterfly mechanism H, as heretofore described. This locks the fastening member K to the shingle, across the corner of the shingle, as shown in Figure 14.

In the operation of our improved flexible shingle wiring machine a flexible shingle is placed on the bed extension 72, cornerwise, the guide ribs 73, 73, guiding the corner of the shingle into the required position. The pulley 2 on the driving shaft 1 is driven by a belt, not shown. On the first downward movement of the foot treadle 4, by the foot of the operator, the driving mechanism B is brought into operation to close the clutch members on the driving shaft 1 and the pulley 2. The driving shaft 1 now makes one complete revolution and then stops. In this first revolution of the driving shaft 1 the wire feed mechanism C feeds a predetermined length of the wire I into the machine, the wire cutter D cuts off the predetermined length of wire and the staple forming mechanism E forms the cut off piece of wire over the staple forming block 35 into an inverted U-shaped staple, as described. On the second downward movement of the foot treadle 4 the driving shaft 1 revolves one complete revolution and stops. In this second revolution of the driving shaft 1 the wire staple is pushed forward off the staple forming block 35, into the required position by the staple forward carrying mechanism F. The staple downward moving mechanism G and the butterfly mechanism H pushes the staple through the shingle and forms the staple into the wire fastening member K on the corner of the shingle, as described. After the first downward movement of the foot treadle 4 all of the operations described above are performed in one revolution of the driving shaft 1, there being always one wire staple in the machine while the other wire staple is being formed into the fastening member K on the shingle.

Having thus described our invention we claim as new :—

1. In a flexible-shingle wiring machine, a frame having a bed, a driving mechanism having a driving shaft, a wire staple forward carrying mechanism consisting of a cam on the driving shaft engaging with a roll in a vertical frame which is reciprocally supported in bearings in a fixed frame on the main frame of the machine, a bell-crank lever pivotally secured to a bracket on the main frame and having a vertical and a horizontal arm, a link on the horizontal arm adjustably secured to the lower end of a vertical connecting rod the upper end of which is adjustably secured to the reciprocating frame, means for adjusting the connecting rod, staple forward pushing plates on the bed of the machine and operatively connected with the upper end of the vertical arm of the bell-crank lever, and a spring on the connecting rod, whereby the spring will operate to move the staple forward pushing plates forward and the cam will move the staple forward pushing plates backward.

2. In a flexible-shingle wiring machine, a frame having a bed in which is an opening, a driving mechanism having a driving shaft, a butterfly mechanism consisting of a cam on the driving shaft engaging with a block on the upper end of a vertical connecting rod working through a bearing in a U-shaped frame fixed to the main frame of the machine and a bearing in the bed of the machine, an adjusting member on the connecting rod, a spring on the connecting rod intermediate the bed bearing and the adjusting member, a practically horizontal lever pivotally secured to a bracket on the machine, the rear end of said lever being pivotally and adjustably secured to the lower end of the connecting rod, guide-ways suspended from the bed of the machine, a slide frame on the guideways and having a slot in which is the forward end of the horizontal lever, said slide frame having an upper flat horizontal surface and two butterfly wing members pivotally secured to the bed of the machine, in the opening in the bed, each of said butterfly wing members resting on the upper flat horizontal surface of the slide and each of the butterfly wing members having projections which enter corresponding recesses in an upper slide in the machine whereby the cam forces the connecting rod downwards and the slide upwards, against the tension of the spring, the tension of the spring tending to reverse these operations.

3. In a flexible-shingle wiring machine, a frame having a bed in which is an opening, a driving mechanism having a driving shaft, means for forming an inverted U-shaped wire staple into a fastening member on a flexible shingle, comprising a staple downward moving mechanism consisting of a cam on the driving shaft and engaging with a roll on a vertical slide frame slidably supported on ways on the main frame, the lower end of the slide frame forming one half of a die with recesses in the end, means on the lower end of the slide frame for holding an inverted U-shaped wire staple, the cam on the driving shaft operating to move the wire staple downwards through the opening in the bed of the machine and a butterfly mechanism consisting of a cam on the driving shaft engaging with a block on the upper end of a vertical connecting rod working through a bearing in the bed of the machine, an adjusting member on the connecting rod, a spring on the connecting rod intermediate the bed bearing and the adjusting member, a practically horizontal lever pivotally secured to a bracket on the main frame, the rear end of said lever being pivotally and adjustably secured to the lower end of the connecting rod, guide ways suspended from the bed of the machine, a slide frame on the guide ways and having a slot in which is the forward end of the horizontal lever, said slide frame having an upper flat horizontal surface, and two butterfly wing members pivotally secured to the bed of the machine, in the opening in the bed, the butterfly wing members resting on the flat upper end of the slide and having projections which enter the recesses in the upper die in the upper slide frame, whereby the cam forces the connecting rod downwards, against the tension of the spring, the tension of the spring tending to reverse these operations.

4. In a flexible-shingle wiring machine, the combination of the following instrumentalities, a frame, a driving mechanism controlled by a foot treadle, a wire feed mechanism C operatively connected with the driving mechanism, to a staple forming mechanism, a wire staple forming mechanism E operatively connected with the driving mechanism, a wire cutter D operatively connected to said staple forming mechanism, a wire staple forward carrying mechanism F operatively connected with the driving mechanism, a wire staple downward moving mechanism G operatively connected with the driving mechanism and a butterfly mechanism H operatively connected with the driving mechanism and which cooperates with the wire staple downward moving mechanism G to form an inverted U shaped wire staple into a wire fastening member K on a flexible shingle, so constructed and arranged that when one wire staple is being formed into a wire fastening member K on the corner of a flexible shingle, another wire staple is being formed in the machine.

5. In a flexible-shingle wiring machine having a frame, a bed on the frame in which is an opening, a driving mechanism, a driving shaft, a butterfly wire forming mechanism consisting of a cam on the driving shaft, a connecting rod, a block on the connecting rod, the cam engaging with the block, an adjusting member on the connecting rod, guide-ways on the bed, a lower slide in the guide-ways, two butterfly wing members pivotally secured to the bed in the bed opening, each of the butterfly wing members bearing on the slide, guide ways on the frame, an upper slide in the latter guideways, means on the upper slide and coacting means on the butterfly wings for forming a wire into a fastening member on the corner of a shingle, and means for operating the slides.

In testimony whereof, we have signed our names to this specification.

ALBERT ABBE GRISWOLD.
ALVIN CARROLL GODDARD.